Figures 1, 2:
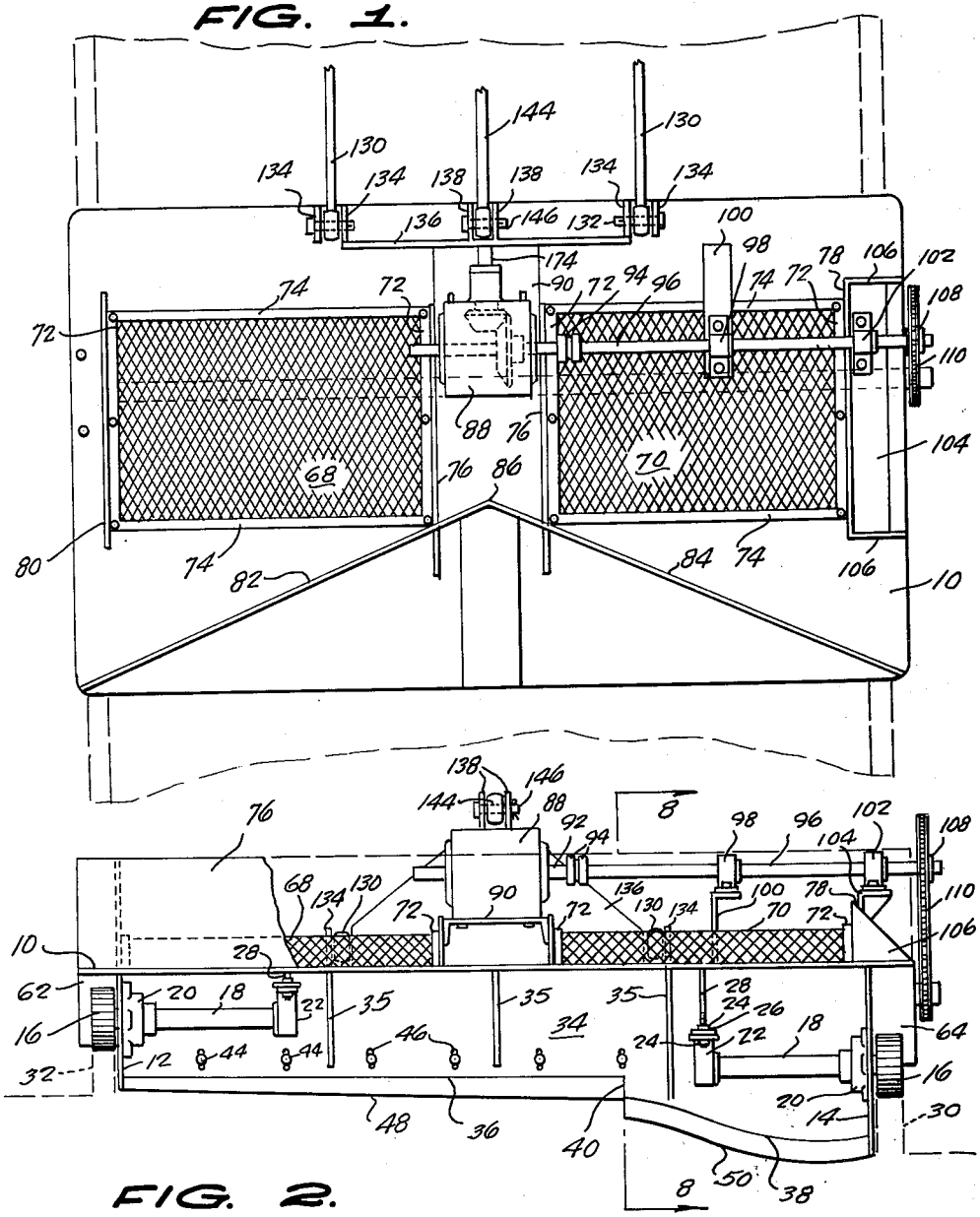

Oct. 23, 1962 W. E. PATTERSON ET AL 3,059,355
CURB AND SIDEWALK GRADING DEVICE
Filed Aug. 8, 1961 4 Sheets-Sheet 1

INVENTORS
WILLIAM E. PATTERSON,
HERBERT W. KRUG,
BY
McMorrow, Berman + Davidson
ATTORNEYS.

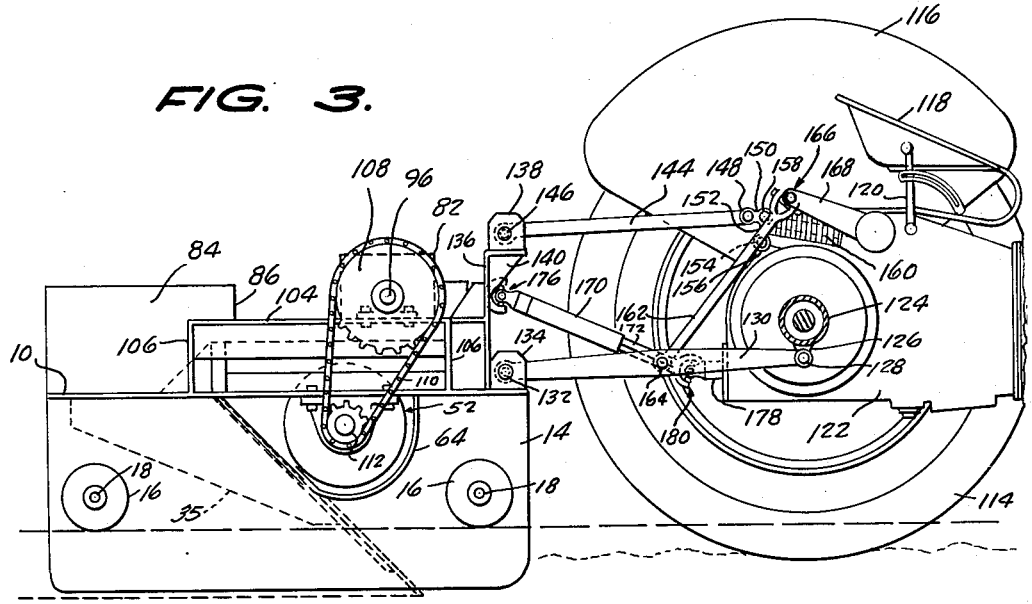
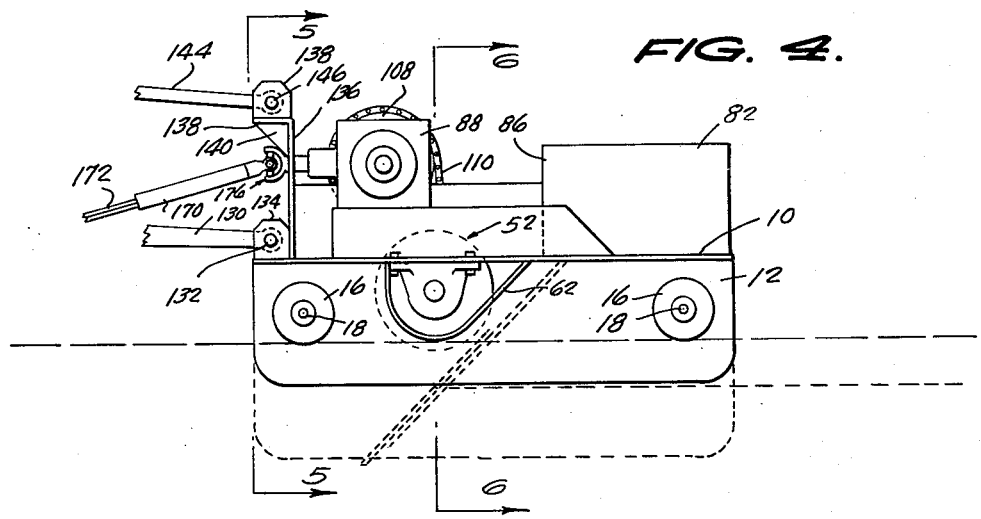

INVENTORS
WILLIAM E. PATTERSON,
HERBERT W. KEUG,
BY

McMorrow, Berman + Davidson
ATTORNEYS.

3,059,355
CURB AND SIDEWALK GRADING DEVICE
William E. Patterson and Herbert W. Krug, Phoenix, Ariz., assignors to John F. Long Properties, Inc., Phoenix, Ariz., a corporation of Arizona
Filed Aug. 8, 1961, Ser. No. 130,040
5 Claims. (Cl. 37—108)

This invention relates to a machine for simultaneous grading of a curb and sidewalk area or zone, in preparation of the ground for subsequent pouring of concrete.

It is an object of the invention to provide a grading machine which is small in size, in weight, and possessed of simplicity of construction. A further object is to provide such a machine, which is additionally capable of ready attachment to most existing tractors. A still further object is to provide for constant ejection of the surplus material removed by scraping, at fairly high speed and with a high degree of control without the attention of the operator. Another object is to control downward pressure of the machine through the draft connection to the tractor.

Figure 5:
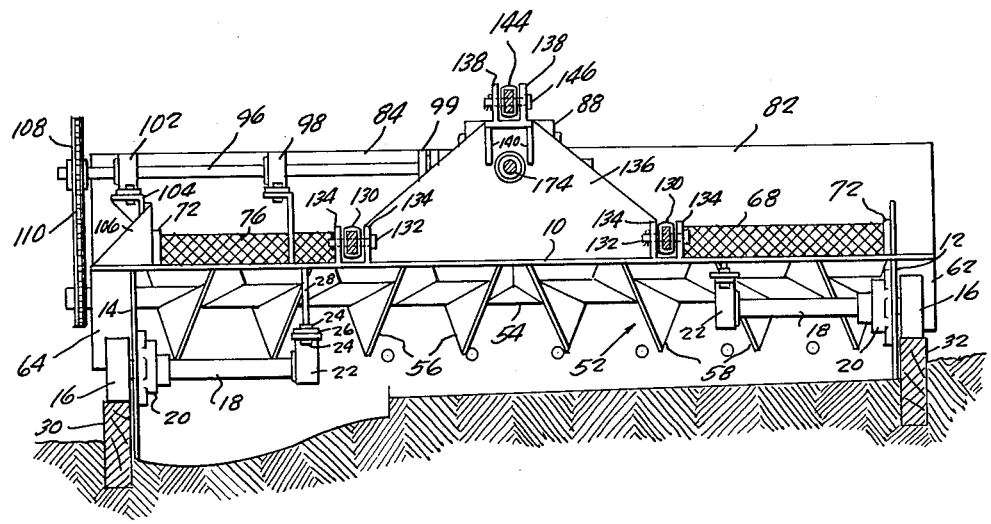
Figure 6:
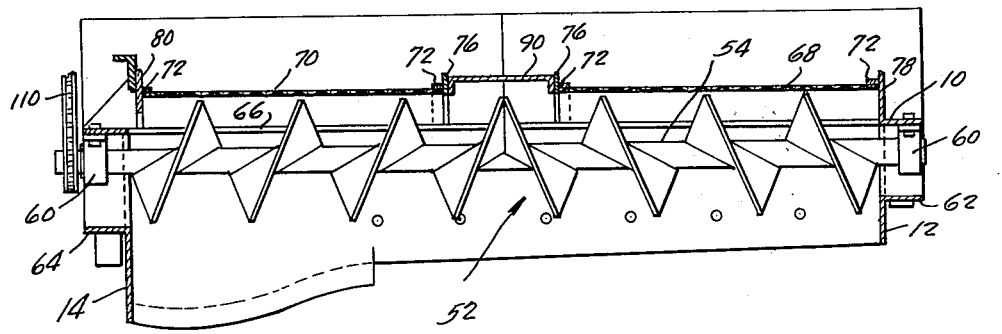
Figure 7:
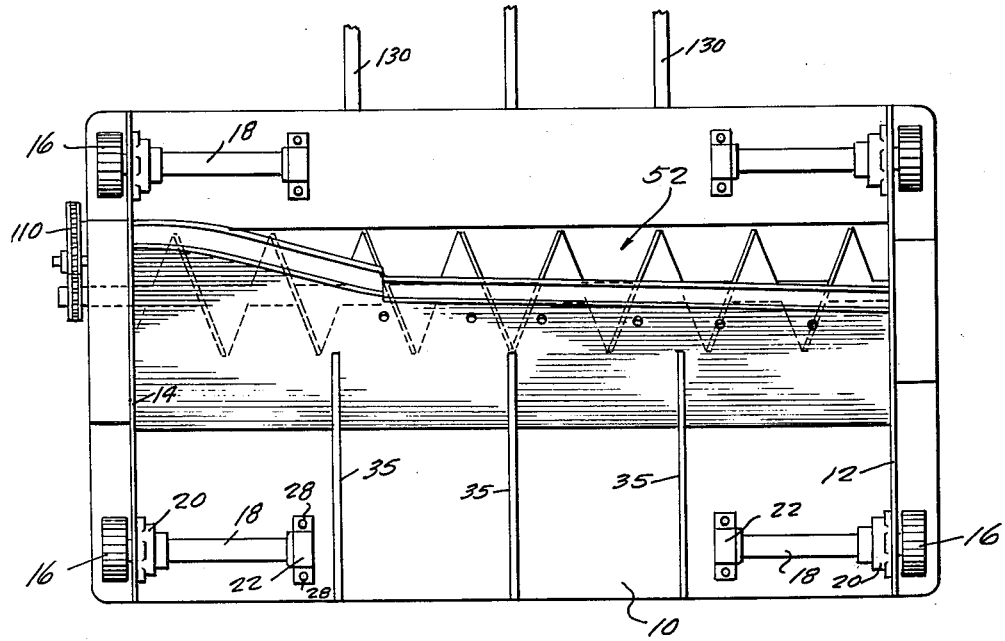
Figure 8:
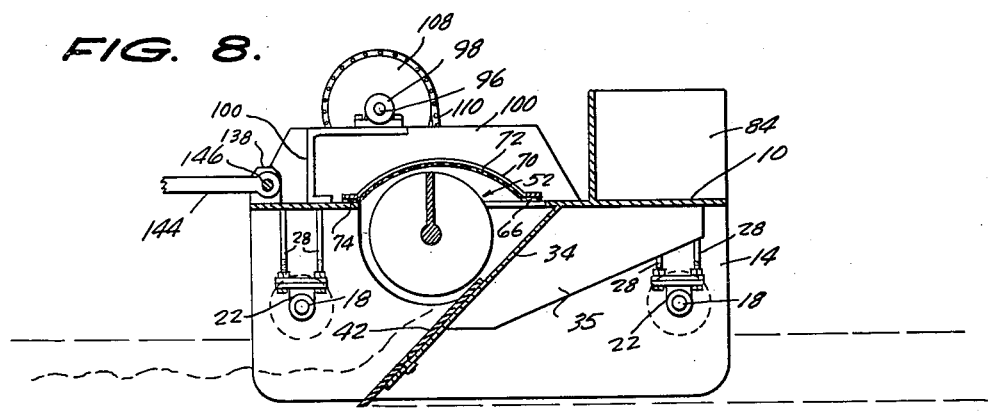

These and other objects, which will be apparent, are attained by the present invention, a preferred embodiment of which is described in the following specification, as illustrated in the drawings, in which:

FIGURE 1 is a top plan view of the grader, with the trailing end lowermost,

FIGURE 2 is a rear elevation of the device of FIGURE 1, partly broken away, and as seen from below in FIGURE 1, FIGURE 3 is a side elevational view, seen from the right side of FIGURE 1 and showing the rear portion of the tractor and the draft connections, FIGURE 4 is a side elevational view taken from the left of FIGURE 1, FIGURE 5 is a sectional view taken on the plane of the line 5—5 of FIGURE 4, FIGURE 6 is a sectional view taken on the plane of the line 6—6 of FIGURE 4, FIGURE 7 is a bottom plan view of the grader shown in FIGURE 1, with the trailing end lowermost, and FIGURE 8 is a sectional view taken on the plane of the line 8—8 in FIGURE 2.

Referring to the drawings by characters of reference, the main structural element of the grader is a rectangular plate 10, with rounded corners, which constitutes a deck or platform for supporting and suspending the several parts of the grader. On the underside of plate 10, slightly inwardly of the side edges thereof, are a pair of parallel, vertical, side plates 12, 14. Plate 14 is on the side of the grader intended to operate in the gutter zone, and therefore extends lower than plate 12. Near their ends, plates 12 and 14 each carry rollers 16, each mounted on an axle 18, journalled in a flange 20, which is bolted in place around an opening in the plate, and the inner end of axle 18 being journalled in an inverted pillow block 22, which is secured by nuts 24 and a washer plate 26, to a pair of bolts 28 depending from the underside of deck 10. It will be noted that axles 18 are lower on plate 14 than on plate 12, because the form 30 at the gutter edge is at a lower level than the form 32 at the sidewalk edge. Hence, the four bolts 28 are also longer on the side having plate 14.

The scraper blade mounting plate 34 and its corner bracing plates 35 are permanently attached to the underside of the grader, being secured as by welding along their upper edges to the underside of plate 10, (FIGURE 8), and with the end edges of the plate being welded to the respective, side plates 12 and 14. Preferably, the scraper mounting plate is inclined at an oblique angle to the horizontal (i.e. to plate 10) with its lower edge extended in the direction of progress of the grading operation. Mounting plate 34 has a lower edge with a horizontal portion 36, coextensive with the sidewalk width, and a curved portion 38, coextensive with the gutter width, and connecting with portion 36 through a vertical edge 40. The removable scraper blade 42 is secured by screws 44, in vertically elongate slots 46 in mounting plate 34, and has a working edge 48 extending below edge 36 of the mounting plate, and inclined at a slight angle to the horizontal, and a working edge 50, below and parallel to edge 38 of the mounting plate, and conforming to the desired gutter contour. By virtue of elongate slots 46, a certain degree of vertical adjustment of the blade is possible.

It will be seen that in the forward progress of the grader, the earth scraped away will tend to climb the slanted blade and accumulate. In relief of this situation, there is provided, on the underside of the grader, above the blade, a helical conveyor, or auger 52, having a central shaft 54 extending transversely of the grader, and convolutions 56, 58, with pitch of opposite hand on each half of the shaft length. The ends of the auger shaft 54 pass through openings in plates 12 and 14, and are journalled in pillow blocks 60, bolted to the underside of deck 10 at opposite sides thereof, and the shaft is rotated by power transmitted from the towing tractor, as will be seen. To permit ejection of the earth moved by the auger, the openings for shaft 54 in plates 12 and 14 are of considerable size, and secured in these respective openings are a pair of framing bands 62, 64, which are of sufficient width to carry the outgoing earth beyond the forms 30, 32, which serve as rails for rollers 16.

In order to employ an auger of large diameter, and resultant high capacity, without increasing the over-all height of the grader, the deck plate 10 is provided with a transversely extending, rectangular, opening 66 (FIGURES 6 and 8), permitting extension of the upper part of the auger screw above the deck, the opening being covered by screen guards 68, 70, on each side of center, mounted on arched frames 72, and having end straps 74, bolted to deck 10. At their inner ends, screens 68, 70 are attached to vertical plates 76, and at their outer ends to plates 78, 80, and the plates having suitable openings affording clearance for the auger.

Another advantage of the opening 66 is that it provides relief for possible congestion in the scavenging operation, with the earth, in such case, seeping through the screen and onto deck 10, from whence it is ultimately removed to the sides by action of a plow like system of plates 82, 84, in V-form, rising perpendicularly from deck 10, and meeting in an apex at 86. It wil be noted that the side edges of deck 10 extend beyond rollers 16, so that no earth from the plateform falls on rails 30, 32. Another advantage of the opening 66 is that it permits observation of, and limited access to, the auger screw.

Power from the towing tractor, for turning the auger is communicated through a gear box 88, mounted on a length of channel iron 90, secured to vertical plates 76, and located to provide clearance for the auger. Shaft 92 of the gear box is connected, through a coupling 94, to a shaft 96, journalled in a pair of pillow blocks, one of which, 98, is mounted on a bracket 100 carried by deck 10, and the other of which, 102 is mounted on a bracket 104, welded to plate 78, the latter having a pair of triangular end braces 106. At its outer end, beyond the side edge of deck 10, shaft 96 carries a sprocket 108 from which a chain 110 communicates rotation to a sprocket 112, on auger shaft 54.

The towing tractor is shown, in part, in FIGURE 3, where 114 is a driven wheel, 116 a fender, 118, a seat, 120 a hand control, and 122 a transmission housing. The axle housing 124 has a pair of depending lugs 126, one on each side of center, having horizontal pins 128, on which are journalled a pair of towing links 130. The latter are pivotally connected, at their rear ends, to pins 132, carried by upstanding brackets 134 secured to deck 10 at the front thereof. A vertically disposed generally triangular plate 136, welded to deck 10, transversely thereof, and also to brackets 134, has a bracket 138 at its top, medially of braces 134 and reinforced by corner braces 140. A third tow link, 144, is pivotally connected at its rear end to a pin 146, carried by upper bracket 138, and at its forward end to a pin 148, carried by one arm 150 of a bell crank lever, the other arm 152 of which is pivoted on a pin 154 carried by a journal block 156 on the transmission. The bell crank also has a pivotal connection through a pin 158, with the piston of a recoil check 160, or other suitable cushioning device.

For lifting the grader, as for transportation to and from a job site, a pair of links 162 are pivoted on pins 164 carried centrally on draft links 130, and converge to a universal coupling at 166, on the outer end of a swing-mounted lever 168, which is actuated by a hydraulic cylinder (not shown) in the conventional manner, as in Ford tractors equipped with the Ferguson type of power lift. It will be seen that when a pulling force is applied to link 162, the grader will be lifted by force applied at pins 132, and will remain in substantially horizontal position due to the action of the upper link 144. Since link 144 is shorter than link 130 there will actually be a slight forward tilt to the grader, when lifted.

Rotation is communicated to the gear box 88 on the grader by means of a flexible shaft having telescoping parts 170, 172, part 170 being connected to and input shaft 174 of gear box 88 through a universal joint 176, a suitable opening being provided in plate 136 for shaft 174, and to a power take-off shaft 178 of transmission 122 of the tractor, through a universal joint 180. The rotation of the auger will, of course, be such that the earth tends to move outward from the center of the grader. With the pitches of the auger arranged as shown in the drawing, this also entails that the screw blade, in the lower part of its travel in rotation, urges the earth forward, as well as sidewise, which lessens the chance of pile-up and clogging, and in the upper part of its travel, urges the earth backward as well as sidewise, so that whatever earth escapes to the top of the platform is urged against the plow element to guide it into lateral discharge.

It will be seen that there has thus been provided, a grader which, while of minimized dimensions, weight and complexity, is nevertheless durable, efficient and flexible in the performance of its intended functions. The provision of the auger in close association with the scraper blade not only makes for efficient removal but enables compactness of construction, and these features are further enhanced by the provision for removal above the grader platform, as well as below. The two-level drawbar linkage not only enables ready transport of the grader during periods of non-operation, but also provides for operator control of the effective weight of the grader, and hence its effect on the rails as well as the scraping action of the scraper blade. The dual action of the auger, wherein a single, integral tool is effective to move earth both left and right from the center of the operation is another important feature.

Generally speaking, whereas a certain, preferred embodiment has been shown and described, various modifications will become apparent, in the light of this disclosure, and the invention should not, therefore, be deemed as limited, except insofar as shall appear from the spirit and scope of the appended claims.

We claim:

1. A grader for sidewalk and gutter areas, and the like, comprising a platform with depending, parallel, vertical sideplates, offset from the side edges of said platform, and of unequal widths, a scraper-blade mounting plate attached to the underside of said platform and to said side plates, obliquely disposed with respect to said platform, and having a series of elongate perforations, a scraper blade secured by bolts engaging said perforations, hand having a ground-engaging lower edge with a first section of slight taper to the horizontal, and a second, curved section extending below said first section, a set of rollers carried in pairs on said side plates, with said pairs mounted on axes of different elevation, journal means depending from said platform at the ends thereof, and disposed in overlying relation to said mounting plate, an auger screw having a shaft with ends mounted in said journal means, said screw having pitches of opposite hand on respective ends thereof, from the middle outward, said platform having a screen-covered opening, and a portion of said auger extending through said opening, an element on said platform with upright surfaces converging to an apex directed toward said opening, a gear box on said platform having a shaft for receiving rotation input from a tractor, said gear box having an output shaft, a chain and sprocket unit communicating rotation from said output shaft to said auger shaft, a pair of brackets at the leading end of said platform, and spaced outwardly of the center thereof, and a third bracket at the leading end of said platform, at the center thereof, and located in vertically spaced relation above said pair of brackets, each of said brackets having openings for a pin adapted to pivotally mount the rearward end of a draft link from the towing tractor.

2. A grader for sidewalk and gutter areas, and the like, comprising a platform with depending side plates of unequal widths, a scraper-blade mounting plate attached to the under side of said platform and to said side plates, obliquely disposed with respect to said platform, a scraper blade secured to said mounting plate, and having a ground-engaging lower edge with a first, substantially horizontal section, curved, and a second section extending below said first section, a set of rollers carried in pairs on said side plates, with the pair on the wider plate at a lower level than the other pair, an auger screw journalled for rotation on a horizontal axis beneath said platform, and partially protruding through an opening in said platform, said auger having pitches of opposite hand on its respective ends, a two-sided deflector element on said platform with meeting sides converging in a direction toward said opening, power transmission means on said platform connected to said auger and adapted for connection to the power take-off of a tractor, and a pair of spaced brackets and an intermediate bracket at the leading end of said platform, with said intermediate bracket spaced vertically above the level of said pair of brackets, said brackets adapted to pivotally mount the rear ends of draft links pivotally connected to the towing tractor.

3. A grader for sidewalk and gutter areas, and the like, comprising a platform with depending sideplates of unequal widths, and having a ground-engaging lower edge with a first, substantially horizontal section, and a second, curved section extending below said first section, a set of rollers carried in pairs on said side plates, with the pair on the wider plate at a lower level than the other pair, an auger screw journalled for rotation on a horizontal axis beneath said platform, and partially protruding through an opening in said platform, said auger having pitches of opposite hand on its respective ends, a two-sided deflector element on said platform with meeting sides converging in a direction toward said opening, power transmission means on said platform connected to said auger and adapted for connection to the power take-off of a tractor, and a pair of spaced brackets and an intermediate bracket at the leading end of said platform, with said intermediate bracket spaced vertically above the level of said pair of brackets, said brackets adapted to pivotally mount the rear ends of draft links pivotally connected to the towing tractor.

4. A grader for sidewalk and gutter areas, and the like, comprising a platform with depending side plates of unequal widths, a set of rollers carried in pairs on said side plates, with the pair on the wider plate at a lower level than the other pair, an auger screw journalled for rotation on a horizontal axis beneath said platform, and partially protruding through an opening in said platform, said auger having pitches of opposite hand on its respective ends, a two-sided deflector element on said platform with meeting sides converging in a direction toward said opening, power transmission means on said platform connected to said auger and adapted for connection to the power take-off of a tractor, and a pair of spaced brackets and an intermediate bracket at the leading end of said platform, with said intermediate bracket spaced vertically above the level of said pair of brackets, said brackets adapted to pivotally mount the rear ends of draft links pivotally connected to the towing tractor.

5. A grader for sidewalk and gutter areas, and the like, comprising a platform with depending side plates of unequal widths, a set of rollers carried in pairs on said side plates, with the pair on the wider plate at a lower level than the other pair, an auger screw journalled for rotation on a horizontal axis beneath said platform, and partially protruding through an opening in said platform, said auger having pitches of opposite hand on its respective ends, guide means on the top of said platform, arranged to intercept earth from said auger, above the opening, and for moving said earth laterally of the platform, power transmission means on said platform connected to said auger and adapted for connection to the power take-off of a tractor, and a pair of spaced brackets and an intermediate bracket at the leading end of said platform, with said intermediate bracket spaced vertically above the level of said pair of brackets, said brackets adapted to pivotally mount the rear ends of draft links pivotally connected to the towing tractor.

References Cited in the file of this patent
UNITED STATES PATENTS

| | | |
|---|---|---|
| 150,057 | Kimball | Apr. 21, 1874 |
| 1,869,916 | Schmid | Aug. 2, 1932 |
| 1,904,948 | Maxon et al. | Apr. 18, 1933 |
| 2,526,396 | Nowlin | Oct. 17, 1950 |
| 2,566,562 | Hale | Sept. 4, 1951 |
| 2,609,620 | Gardner et al. | Sept. 9, 1952 |